United States Patent [19]

Baker et al.

[11] 4,453,388
[45] Jun. 12, 1984

[54] LOCKING FUEL CAP

[75] Inventors: Steven F. Baker, Bellevue; Albert D. Johnston, Huron, both of Ohio

[73] Assignee: General Motors Corporation, Detroit, Mich.

[21] Appl. No.: 419,945

[22] Filed: Sep. 20, 1982

[51] Int. Cl.³ .............................................. B05D 55/14
[52] U.S. Cl. ...................................... 70/165; 220/210
[58] Field of Search ................. 70/158, 163, 165–173, 70/221, 222; 220/203, 210, 288, 303

[56] References Cited

U.S. PATENT DOCUMENTS 4,132,091 1/1979 Aro ........................................ 70/165
4,231,240 11/1980 Fujita ..................................... 70/173
4,342,208 8/1982 Evans ..................................... 70/165

Primary Examiner—Robert L. Wolfe
Attorney, Agent, or Firm—Donald F. Scherer

[57] ABSTRACT

A fuel cap has a locking mechanism for preventing unauthorized removal of the fuel cap from the fuel fill tube. The lock mechanism includes a cam structure which is operable to provide a selective drive connection, depending upon the condition of the lock mechanism, between the hand grip portion and the threaded closure portion of the fuel cap during rotation of the hand grip in the cap removal direction. The cam mechanism is operable to provide a drive connection in the cap insertion direction regardless of the condition of the lock mechanism.

3 Claims, 6 Drawing Figures

LOCKING FUEL CAP

This invention relates to fuel caps and more particularly to fuel caps having a lock structure for preventing unauthorized removal of the fuel cap.

It is an object of this invention to provide an improved locking fuel cap wherein a cam member is controlled by a locking member to provide a selective drive connection between the hand grip and closure portions of the fuel cap.

It is another object of this invention to provide an improved locking fuel cap having a lock controlled cam drive operable to permit (a) removal of the cap when unlocked, (b) freewheeling in the removal direction between the handle and closure when locked, and (c) a drive connection in the insertion direction of the cap regardless of the lock condition.

A further object of this invention is to provide an improved locking fuel cap having a hand grip portion and a threaded portion with a selectively operable cam drive connection therebetween wherein the cam drive has a lock-operated stop member for preventing the drive connection in the removal direction when the cap is locked, for permitting the drive connection in the removal direction when the cap is unlocked, and for providing a drive connection in the insertion direction regardless of the lock condition.

These and other objects and advantages of the present invention will be more apparent from the following description and drawings in which.

Figure 1:
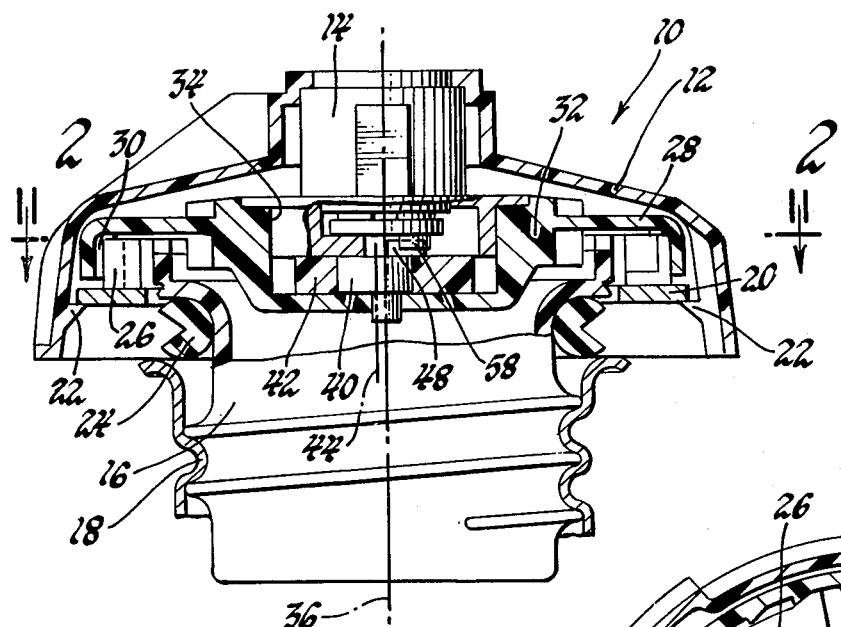
FIG. 1 is an elevational view partly in section of a fuel cap incorporating the present invention.

Referring to the drawings, wherein like characters represent the same or corresponding parts throughout the several views, there is seen in FIG. 1 a fuel cap, generally designated 10, having a hand grip or outer cover portion 12 in which is secured a conventional key-operated locking mechanism 14. Rotatably disposed within the hand grip 12 is a threaded closure member 16 adapted to engage a fuel fill tube such as 18. The threaded closure 16 is secured in the hand grip 12 by a lock ring 20 which is engaged by a plurality of tabs 22 formed integrally with the hand grip 12. A V-grooved O-ring 24 is disposed on the threaded portion 16 and cooperates with the fuel fill tube 18 to provide a compliant seal when the fuel cap 10 is fully installed in the fill tube 18.

Figure 2:
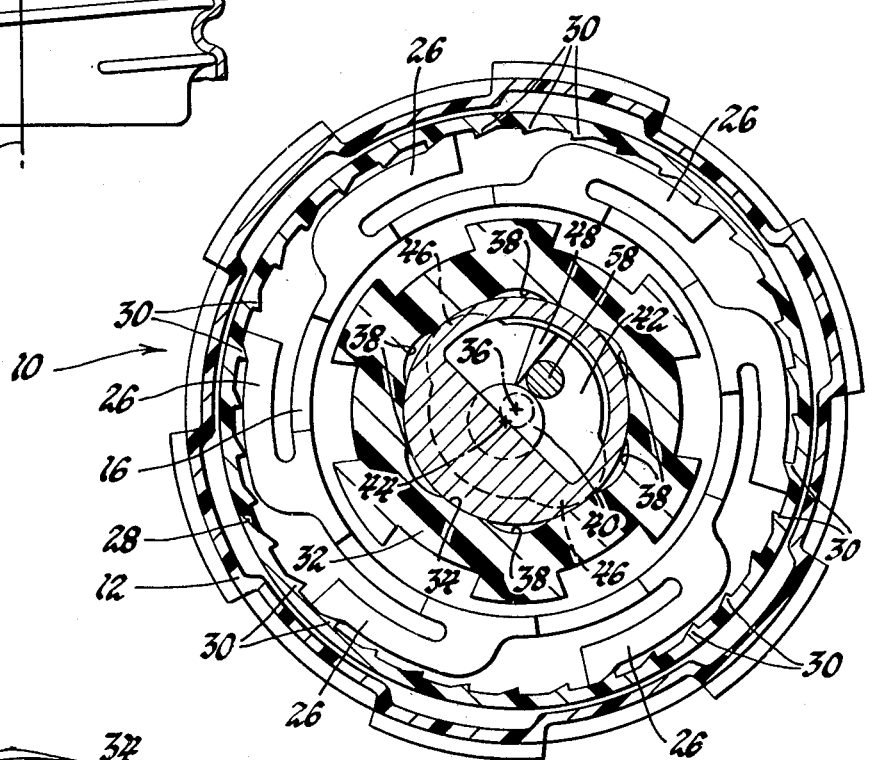
FIG. 2 is a sectional view taken along line 2—2 of FIG. 1.

The threaded closure 16 has integrally formed therewith a plurality of torque arms 26, as best seen in FIG. 2. The torque arms 26 are cantilevered outwardly from the main body of threaded closure 16 and are disposed in drive relationship with a shell 28.

The shell 28 has formed thereon a plurality of ratchet teeth 30 which cooperate with the torque arms 26 to provide a positive drive between the shell 28 and the closure 16 when the shell is rotated in the counterclockwise direction as seen in FIG. 2. The ratchet teeth 30 and torque arms 26 will provide a torque limited connection between the shell 28 and the closure 16 when the shell 28 is rotated in the clockwise or cap insertion direction.

Figure 3:
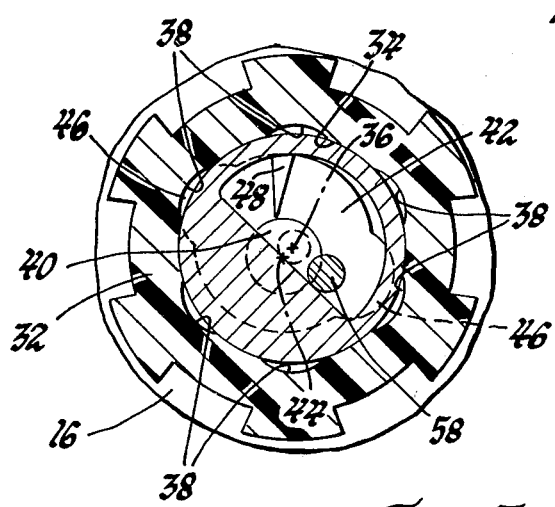
FIG. 3 is a portion similar to FIG. 2 showing the locking structure in another operating condition.

The shell 28 has formed integrally therewith a central body portion 32 in which is formed a cavity 34. The cavity 34 surrounds a portion of the lock mechanism 14 such that the central axis of the cavity 34 and the axis of the lock 14 are disposed coincidentally at 36. The cavity 34 has formed therein a plurality of cam lobes 38, as best seen in FIGS. 2 and 3. These lobes are formed equiangularly about the axis 36.

The lock mechanism 14 has an eccentric mount portion 40 on which is rotatably disposed a cam 42. The cam 42 and the eccentric mount 40 have a common axis 44 which is eccentrically disposed relative to axis 36. The cam 42 has integrally formed thereon a pair of lobes 46 which have an outer surface complementary to the lobes 38. The cam 42 also has formed thereon a cam stop 48 which extends upwardly, as seen in FIG. 1, from the main body of cam 42.

The lock mechanism 14 has a cam engaging pin 58 which extends into the rotary path of the stop member 48. The pin 58 is rotatable about the axis 36 by key operation of the lock mechanism 14. The pin 58 is rotatable by the key operation from the locked position shown in FIG. 2 to the unlocked position shown in FIG. 3 when the pin 58 is in the locked position shown in FIG. 2, rotation of the hand grip 12 in the counterclockwise or cap removal direction will result in the pin 58 abutting the stop member 48 such that unitary rotation of the cam and lock mechanism 14 about axis 36 will occur.

Clockwise rotation of the hand grip 12 will result in clockwise rotation of the lock mechanism 14 about axis 36. The cam member 42 will also begin rotation about axis 36. However, frictional engagement between the lobes 46 and the cavity 34 will result in rotation of the cam 42 about axis 44 in a clockwise direction. The rotation of cam member 42 about axis 44 will result in one of the lobes 46 engaging one of the lobes 38 as seen in FIG. 3. When this engagement occurs, a positive drive is provided between the hand grip 12 and the shell 28. Driving of the shell 28 causes a driving force to be imposed on the torque arms 26 such that the closure 16 is rotated until the fuel cap is fully inserted in the fill tube 18 at which time the torque limiting function prevents further rotation of the closure 16.

Thus, it is seen when the lock mechanism 14 is placed in the lock condition, the fuel cap 10 can be inserted in the fill tube but not removed therefrom.

For removal from the fill tube, the lock 14 is operated by the key member to the unlocked condition such that the pin 58 is positioned relative to the eccentric mount 40, as seen in FIG. 3. When the pin 58 is in this position, the cam 42 is free to rotate, due to friction contact, about the eccentric mount 40 in either the clockwise or counterclockwise direction from the position shown in FIG. 2. Since either direction of rotation of the cam 42 about eccentric 40 will cause engagement of one of the lobes 46 with one of the lobes 38, a positive drive connection between the hand grip 12 and the shell 28 is established for either direction of rotation. Therefore, the shell 28 is operable to drive the closure 16 in a positive manner so that the cap can be removed. The condition of pin 58 does not affect the cap installation and therefore the cap can be installed on the fuel fill tube whether the lock mechanism is in a locked condition or an unlocked condition.

Figure 4:
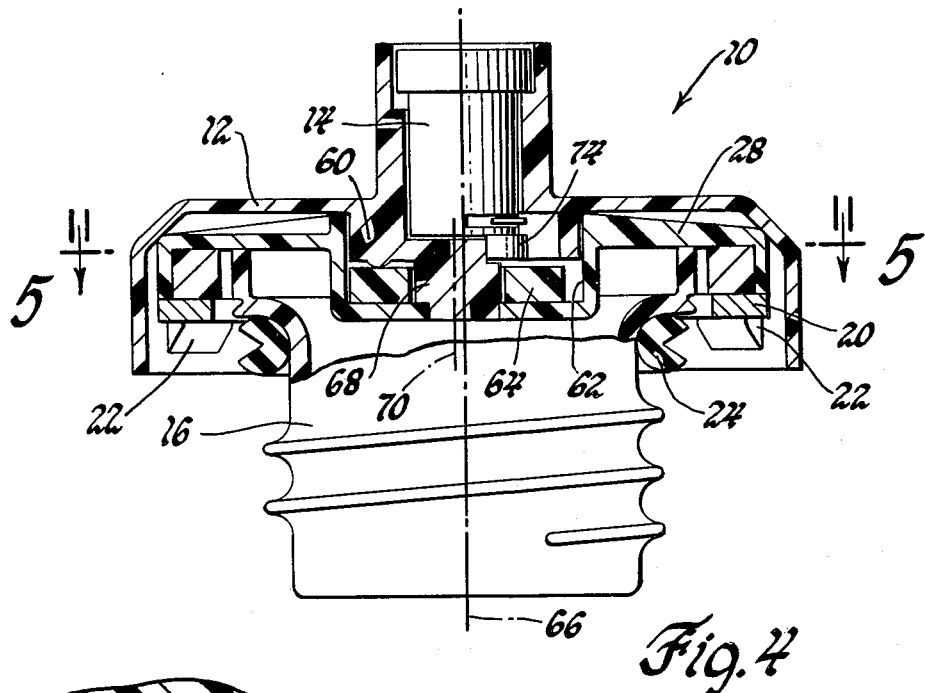
FIG. 4 is an elevational view partly in section of a fuel cap incorporating another embodiment of the invention.

The fuel cap 10, shown in FIG. 4, is similar to that shown in FIG. 1, and includes a hand grip portion 12 in which is rotatably disposed a threaded closure 16. The threaded closure 16 is contained in a manner similar to that described above for FIG. 1. The inner shell 28 is rotatably disposed on a cylindrical portion 60 of the hand grip 12. The shell 28 has a cylindrical cam surface 62 in which is disposed a cylindrical cam 64. The axis of rotation for surface 62 is disposed coaxially with the hand grip rotational axis 66. The hand grip 12 has integrally formed therewith an eccentric mount 68 on which the cam 64 is rotatably disposed for rotation about an axis 70 which is eccentric to axis 66.

Figure 5:
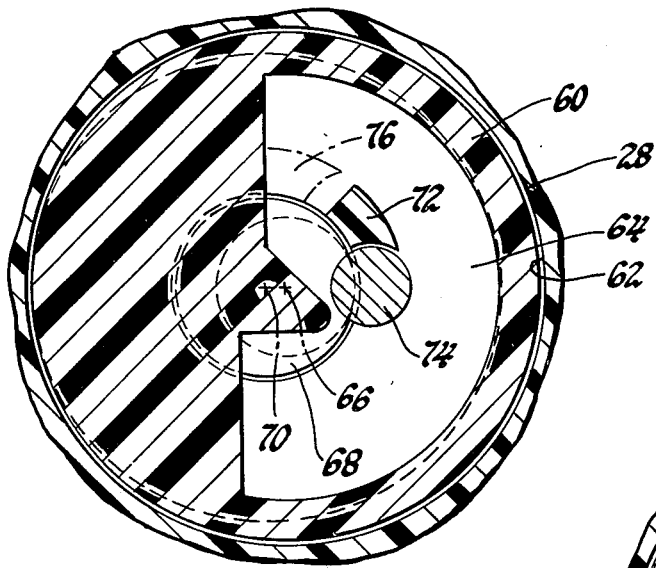
FIG. 5 is a view taken along line 5—5 of FIG. 4 showing the lock mechanism in one condition of operation.
Figure 6:
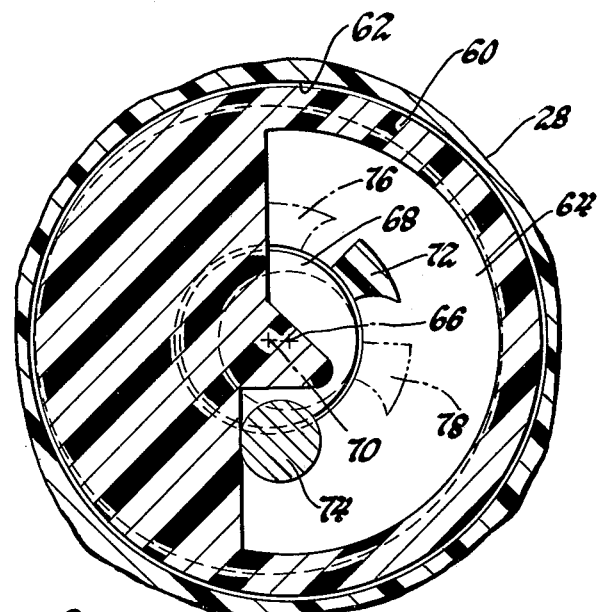
FIG. 6 is a view similar to FIG. 5 showing the lock mechanism in the other condition of operation.

As best seen in FIGS. 5 and 6, the cam 64 has formed integrally therewith a cam stop member 72 which is radially alignable with a cam engaging pin 74 which is operated by the lock mechanism 14. The pin 74 is rotatable from the lock position shown in FIG. 5 to the unlock position shown in FIG. 6.

As seen in FIG. 5, if the hand grip 12 is rotated in the counterclockwise direction, the pin 74 will engage stop member 72 resulting in unitary rotation of the cam 64 and the hand grip 12. If the hand grip 12 is rotated in the clockwise direction, the stop member 72 is free to move relative to the pin 74 toward the phantom position shown at 76. The relative rotation of the cam member 64 will result in a positive drive connection between the cam 64 and the cam surface 62 such that the shell 28 will be rotated with the hand grip 12. As explained above for FIG. 1, if the shell 28 rotates, a drive connection between the hand grip 12 and threaded closure 16, is present. Rotation of the hand grip in the clockwise direction, as seen in FIGS. 5 and 6, will result in installation of the fuel cap into the fill tube.

When the pin 74 is in the position shown in FIG. 6, the cam stop member 72 is free to rotate about eccentric axis 70 from the solid position shown, to either phantom position 76 or 78, depending upon the direction of rotation of the hand grip 12. Therefore, when the cap is unlocked, as shown in FIG. 6, the fuel cap can be removed or installed on the fuel fill tube.

With both embodiments of the present invention, it is possible to unlock and remove the fuel cap so that fuel can be placed into the vehicle. Prior to inserting the fuel cap, the lock mechanism 14 can be placed in the locked condition and the key removed. In the locked condition, the fuel cap can be reinstalled after fuel filling has taken place, however, cap removal will not be permitted unless the lock 14 is again placed in the unlocked condition. It is not necessary for the operating key to remain in the lock mechanism 14 except during the cap removal operation. The lock mechanism 14 is preferably constructed such that the key cannot be removed unless the lock mechanism is in the locked condition. This will assist the operator in remembering to lock the fuel cap each time it is installed.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A locking fuel cap comprising; a handgripping portion; a lock mechanism carried by said handgripping portion; closure means secured within said handgripping portion and including a threaded portion for securing said fuel cap in a fuel fill tube and a recessed cavity; eccentric mounting means connected to rotate with the handgripping portion; cam means disposed in said recessed cavity and being operatively connected through said eccentric mounting means for unitary rotation with said handgripping poriton; and a cam engaging means on said lock mechanism for centering said cam means in said recess when said lock mechanism is locked and said handgripping portion is rotated in a cap removal direction for thereby preventing rotation of said closure means, for permitting said cam means to be positioned eccentrically in said recessed cavity for providing a rotary drive connection between said handgripping portion and said closure means when said lock mechanism is unlocked and said handgripping portion is rotated in the cap removal direction and for permitting said cam means to be positioned eccentrically in said recessed cavity for drivingly connecting said closure means and said handgripping portion when said handgripping portion is rotated in a cap installation direction regardless of the condition of the lock mechanism.

2. A locking fuel cap comprising; a handgripping portion; a lock mechanism carried by said handgripping portion; closure means secured within said handgripping portion and including a threaded portion for securing said fuel cap in a fuel fill tube and a torque limited drive mechanism; eccentric mounting means connected to rotate with the handgripping portion; cam means disposed in said handgripping portion on said eccentric mounting means; and a cam engaging means on said lock mechanism for enforcing unitary rotation of said cam means and said handgripping portion when said lock mechanism is locked and said handgripping portion is rotated in a cap removal direction and thereby preventing a drive connection with said torque limiting mechanism, for permitting said cam means to drivingly engage said torque limiting drive mechanism for providing a torque limited rotary drive connection between said handgripping portion and said closure means when said lock mechanism is unlocked and said handgripping portion is rotated in the cap removal direction and for permitting said cam means to drivingly connect said closure means and said handgripping portion through said torque limiting mechanism when said handgripping portion is rotated in a cap installation direction regardless of the condition of the lock mechanism.

3. A locking fuel cap comprising; a handgripping portion; a lock mechanism carried by said handgripping portion; closure means secured within said handgripping portion and including a threaded portion for securing said fuel cap in a fuel fill tube and a recessed cavity; eccentric mounting means connected to rotate with the handgripping portion; cam means disposed on said eccentric mounting means; and a cam engaging means on said lock mechanism for enforcing unitary rotation of said cam means and said handgripping portion when said lock mechanism is locked and said handgripping portion is rotated in a cap removal direction for thereby preventing rotation of said closure means, for permitting said cam means to rotate relative to said handgripping portion for providing a rotary drive connection between said handgripping portion and said closure means when said lock mechanism is unlocked and said handgripping portion is rotated in the cap removal direction and for permitting said cam means to rotate relative to said handgripping portion for drivingly connecting said closure means and said handgripping portion when said handgripping portion is rotated in a cap installation direction regardless of the condition of the lock mechanism.

* * * * *